(12) United States Patent
Minhazuddin et al.

(10) Patent No.: US 8,176,154 B2
(45) Date of Patent: May 8, 2012

(54) INSTANTANEOUS USER INITIATION VOICE QUALITY FEEDBACK

(75) Inventors: Muneyb Minhazuddin, Quakers Hill (AU); Stephane C. Laveau, Glebe (AU); Alex M. Krumm-Heller, Gladesville (AU); Neil Hepworth, Artarmon (AU); Alexander Martin Scholte, Chatswood (AU)

(73) Assignee: Avaya Inc., Basking Ridge, NJ (US)

( * ) Notice: Subject to any disclaimer, the term of this patent is extended or adjusted under 35 U.S.C. 154(b) by 1824 days.

(21) Appl. No.: 10/261,914

(22) Filed: Sep. 30, 2002

(65) Prior Publication Data
US 2004/0073641 A1 Apr. 15, 2004

(51) Int. Cl.
*G06F 15/173* (2006.01)
(52) U.S. Cl. .......................... 709/223; 709/224
(58) Field of Classification Search .............. 709/223, 709/224
See application file for complete search history.

(56) References Cited

U.S. PATENT DOCUMENTS

| | | |
|---|---|---|
| 4,791,660 A | 12/1988 | Oye et al. |
| 5,067,127 A | 11/1991 | Ochiai |
| 5,206,903 A | 4/1993 | Kohler et al. |
| 5,506,872 A | 4/1996 | Mohler |
| 5,594,740 A | 1/1997 | LaDue |
| 5,604,786 A | 2/1997 | Engelke et al. |
| 5,724,405 A | 3/1998 | Engelke et al. |
| 5,802,058 A | 9/1998 | Harris et al. |
| 5,828,747 A | 10/1998 | Fisher et al. |
| 5,905,793 A | 5/1999 | Flockhart et al. |
| 5,933,425 A | 8/1999 | Iwata |
| 5,946,618 A | 8/1999 | Agre et al. |
| 5,953,312 A | 9/1999 | Crawley et al. |
| 5,961,572 A | 10/1999 | Craport et al. |
| 5,982,873 A | 11/1999 | Flockhart et al. |
| 6,002,933 A | 12/1999 | Bender et al. |
| 6,021,178 A | 2/2000 | Locke et al. |
| 6,038,214 A * | 3/2000 | Shionozaki ................. 370/230 |

(Continued)

FOREIGN PATENT DOCUMENTS
WO  WO 91/14278  9/1991
(Continued)

OTHER PUBLICATIONS

K. Nichols, Cisco Systems, RFC 2474, Definition of Differentiated Services Field in IPv4 & IPv6 Headers, Dec. 1998.*

(Continued)

*Primary Examiner* — Asghar Bilgrami
(74) *Attorney, Agent, or Firm* — Sheridan Ross P.C.

(57) ABSTRACT

A system for providing a high communications quality is provided. The system comprises: (a) an input operable to receive a message from at least one of first and second network nodes 200 and 204, the first and second network nodes communicating with one another in a session and the message indicating a service problem with the session and (b) a statistic collection agent 248 operable to cause, in response to the message, at least one of the following operations: (i) reconfiguration of one or more attributes or resources in the network; (ii) variation of a sampling frequency of one or more session-related performance attributes associated with the network; (iii) alteration of the types of session-related performance attributes being collected regarding the network; and (iv) collection of session-related information from nodes other than the at least first and second network nodes.

50 Claims, 6 Drawing Sheets

U.S. PATENT DOCUMENTS

| | | | |
|---|---|---|---|
| 6,058,163 | A | 5/2000 | Pattison et al. |
| 6,067,300 | A | 5/2000 | Baumert et al. |
| 6,073,013 | A | 6/2000 | Agre et al. |
| 6,088,732 | A * | 7/2000 | Smith et al. .................. 709/229 |
| 6,122,665 | A | 9/2000 | Bar et al. |
| 6,163,607 | A | 12/2000 | Bogart et al. |
| 6,173,053 | B1 | 1/2001 | Bogart et al. |
| 6,185,527 | B1 | 2/2001 | Petkovic et al. |
| 6,192,122 | B1 | 2/2001 | Flockhart et al. |
| 6,249,757 | B1 | 6/2001 | Cason |
| 6,256,300 | B1 | 7/2001 | Ahmed et al. |
| 6,374,302 | B1 | 4/2002 | Galasso et al. |
| 6,381,472 | B1 | 4/2002 | LaMedica, Jr. et al. |
| 6,381,639 | B1 | 4/2002 | Thebaut et al. |
| 6,421,425 | B1 | 7/2002 | Bossi et al. |
| 6,463,470 | B1 * | 10/2002 | Mohaban et al. ............. 709/223 |
| 6,463,474 | B1 | 10/2002 | Fuh et al. |
| 6,490,343 | B2 | 12/2002 | Smith, Jr. et al. |
| 6,502,131 | B1 * | 12/2002 | Vaid et al. .................... 709/224 |
| 6,526,140 | B1 | 2/2003 | Marchok et al. |
| 6,529,475 | B1 | 3/2003 | Wan et al. |
| 6,529,499 | B1 | 3/2003 | Doshi et al. |
| 6,532,241 | B1 | 3/2003 | Ferguson et al. |
| 6,546,082 | B1 | 4/2003 | Alcendor et al. |
| 6,578,077 | B1 * | 6/2003 | Rakoshitz et al. ............ 709/224 |
| 6,601,101 | B1 | 7/2003 | Lee et al. |
| 6,647,270 | B1 | 11/2003 | Himmelstein |
| 6,668,042 | B2 | 12/2003 | Michaelis |
| 6,678,250 | B1 | 1/2004 | Grabelsky et al. |
| 6,754,710 | B1 | 6/2004 | McAlear |
| 6,760,312 | B1 | 7/2004 | Hitzeman |
| 6,760,774 | B1 | 7/2004 | Soumiya et al. |
| 6,765,905 | B2 * | 7/2004 | Gross et al. ................... 370/389 |
| 6,778,534 | B1 | 8/2004 | Tal et al. |
| 6,798,751 | B1 * | 9/2004 | Voit et al. ..................... 370/252 |
| 6,807,564 | B1 | 10/2004 | Zellner et al. |
| 6,857,020 | B1 | 2/2005 | Chaar et al. |
| 6,954,435 | B2 | 10/2005 | Billhartz et al. |
| 6,964,023 | B2 | 11/2005 | Maes et al. |
| 6,973,033 | B1 * | 12/2005 | Chiu et al. ................. 370/230.1 |
| 6,988,133 | B1 * | 1/2006 | Zavalkovsky et al. ........ 709/223 |
| 7,003,574 | B1 | 2/2006 | Bahl |
| 7,010,097 | B2 | 3/2006 | Zellner et al. |
| 7,010,581 | B2 | 3/2006 | Brown et al. |
| 7,031,311 | B2 | 4/2006 | MeLampy et al. |
| 7,031,327 | B2 | 4/2006 | Lu |
| 7,046,646 | B2 | 5/2006 | Kilgore |
| 7,075,922 | B2 | 7/2006 | Mussman et al. |
| 7,076,540 | B2 | 7/2006 | Kurose et al. |
| 7,076,568 | B2 | 7/2006 | Philbrick et al. |
| 7,099,440 | B2 | 8/2006 | Michaelis |
| 7,103,542 | B2 | 9/2006 | Doyle |
| 7,124,205 | B2 | 10/2006 | Craft et al. |
| 7,170,977 | B2 | 1/2007 | Doherty et al. |
| 7,212,969 | B1 | 5/2007 | Bennett |
| 7,260,439 | B2 | 8/2007 | Foote et al. |
| 7,359,979 | B2 | 4/2008 | Gentle et al. |
| 7,362,745 | B1 | 4/2008 | Cope et al. |
| 2001/0039210 | A1 | 11/2001 | St-Denis |
| 2002/0073232 | A1 | 6/2002 | Hong et al. |
| 2002/0085703 | A1 | 7/2002 | Proctor |
| 2002/0091843 | A1 | 7/2002 | Vaid |
| 2002/0097463 | A1 * | 7/2002 | Saunders et al. .............. 359/124 |
| 2002/0105911 | A1 | 8/2002 | Pruthi et al. |
| 2002/0143971 | A1 | 10/2002 | Govindarajan et al. |
| 2002/0152319 | A1 * | 10/2002 | Amin et al. .................... 709/232 |
| 2002/0176404 | A1 | 11/2002 | Girard |
| 2003/0002650 | A1 | 1/2003 | Gruchala et al. |
| 2003/0016653 | A1 | 1/2003 | Davis |
| 2003/0033428 | A1 | 2/2003 | Yadav |
| 2003/0086515 | A1 | 5/2003 | Trans et al. |
| 2003/0109958 | A1 | 6/2003 | Hogg et al. |
| 2003/0185217 | A1 | 10/2003 | Ganti et al. |
| 2005/0058261 | A1 | 3/2005 | Baumard |
| 2005/0064899 | A1 | 3/2005 | Angelopoulos et al. |
| 2005/0186933 | A1 | 8/2005 | Trans |
| 2005/0278158 | A1 | 12/2005 | Ellison et al. |
| 2006/0067486 | A1 | 3/2006 | Zellner et al. |
| 2006/0069779 | A1 | 3/2006 | Sundqvist et al. |
| 2007/0103317 | A1 | 5/2007 | Zellner et al. |
| 2007/0133403 | A1 | 6/2007 | Hepworth et al. |
| 2008/0151886 | A1 | 6/2008 | Gentle et al. |
| 2008/0151898 | A1 | 6/2008 | Gentle et al. |
| 2008/0151921 | A1 | 6/2008 | Gentle et al. |

FOREIGN PATENT DOCUMENTS

| | | |
|---|---|---|
| WO | 91/14278 | 11/1991 |
| WO | WO 98/46035 | 10/1998 |
| WO | WO 99/51038 | 10/1999 |
| WO | WO 00/41090 | 7/2000 |
| WO | WO 01/26393 | 4/2001 |
| WO | WO 01/75705 | 10/2001 |
| WO | WO 02/00316 | 1/2002 |

OTHER PUBLICATIONS

Getting Started with the Cisco IP Phone 7960/7940, pp. 1-1 to 1-4.
Cisco IP Phone 7960, eLearning Tutorial, at www.cisco.com/warp/public/779/largeent/avvid/products/7960/7960_show_using help.htm.
Peter Pames, "Real-time Transfer Protocol (RTP)" (Sep. 8, 1997), at www.cdt.luth.se/~peppar/docs/lic/html/node166.html.
Kathy Lynn Hewitt, Desktop Video Conferencing: A Low Cost and Scalable Solution to Distance Education, "Chapter 2—Internet Conferencing Protocols" thesis submitted to North Carolina State University (1997), at http://www2.ncsu.edu/eos/service/ece/project/succeed_info/klhewitt/thesis/toc.html.
U.S. Appl. No. 10/165,719, filed Jun. 7, 2002, Krumm-Heller.
Application Note, Emergency 911 in Packet Networks, http:www.fastcomm.com/NewWeb/solutions/e911.html, Sep. 5, 2001, FastComm Communications Corporation,3 pgs.
Baker (Editor), "Requirements for IP Version 4 Routers", RFC 1812, Jun. 1995, 175 pages.
Benjamin W. Wah, et al., "A Survey of Error-Concealment Schemes for Real-Time Audio and Video Transmissions over the Internet," Department of Electrical and Computer Engineering and the Coordinate Science Laboratory, University of Illinois at Urbana-Champaign, Proc. IEEE Int'l Symposium on Multimedia Software Engineering, Dec. 2000.
Bernet et al., "Specification of the Null Service Type", RFC 2997, Nov. 2000, 12 pages.
Bernet, "Format of the RSVP DCLASS Object", RFC 2996, Nov. 2000, 9 pages.
Berney et al., "A Framework for Integrated Services Operation over Diffserv Networks", RFC 2998, Nov. 2000, 29 pages.
Braden et al. "Resource ReSerVation Protocol (RSVP)", RFC 2205, Sep. 1997, 6 pages.
Brown, I. Internet Engineering Task Force, Securing Prioritised Emergency Traffic, http://www.iepscheme.net/docs/draft-brown-ieps-sec-00.txt, Jul. 5, 2001, pp. 1-12.
Carlberg, Ken. Internet Engineering Task Force, Framework for Supporting IEPS in IP Telephony, http://www.iepscheme.net/docs/draft-carlberg-ieps-framework-01.tex, Jul. 4, 2001, pp. 1-24.
Chan et al., "COPS Usage for Policy Provisioning (COPS-PR)", RFC 3084, Mar. 2001, 32 pages.
Cisco Systems, "Cisco Emergency Responder Version 1.1 Data Sheet" (Oct. 2001), 5 pages, copyright 1992-2001.
Ejaz Mahfuz; "Packet Loss Concealment for Voice Transmission Over IP Networks" (2001) (Master thesis, Department of Electrical Engineering, McGill University) (on file with author).
Floyd et al., "Random Early Detection Gateways for Congestion Avoidance", IEEE/ACM Transaction on Networking, Aug. 1993, 22 pages.
Geeta Desai Chennubhotla, "Embedded Systems: Rough start, but voice market growing," EE Times, at http://www.eetimes.com/in_focus/embedded_systems/EOG20020503S0067 (May 6, 2002).
Government Emergency Telecommunications Service (GETS), "White Paper on IP Teleponhy a Roadmap to Supporting GETS in IP Networks," Apr. 27, 2000, Science Applications International Corporation, pp. 1-32.
Grigonis, Computer Telephony Encyclopedia, pp. 268-277 (2000).

Handley et al., "SIP: Session Initiation Protocol", RFC 2543, Mar. 1999, 81 pages.

Herzog et al., "COPS Usage for RSVP", RFC 2749, Jan. 2000, 16 pages.

Huai-Rong Shao et al., "A New Framework for Adaptive Multimedia over the Next Generation Internet," Microsoft Research China; not dated.

IEEE Standards for Information Technology—Telecommunications and information exchange between systems—Local and metropolitan area networks—Common specifications—Part 3: Media Access Control (MAC) Bridges, LAN/MAN Standards Committee of the IEEE Computer Society, ANSI/IEEE Std 802.1D (1998).

IEEE Standards for Local and Metropolitan Area Networks: Virtual Bridged Local Area Networks, The Institute of Electrical and Electronics Engineers, IEEE Std 802.1Q-1998 (Mar. 8, 1999).

International Emergency Preference Scheme (IEPS), http://www.lepscheme.net/, Jun. 16, 2000, pp. 1-2.

International Engineering Consortium, "Silence Suppression and Comfort Noise Generation" at http://www.iec.org/online/tutorials/voice_qual/topic07.html (Jul. 1, 2002).

International Telecommunication Union; "General Aspects of Digital Transmission Systems: Coding of Speech at 8kbit/s Using Conjugate-Structure Algebraic-Code-Excited Linear-Prediction" (CS-ACELP) ITU-T Recommendation G.729 (Mar. 1996).

ITU, "Packet-based multimedia communications systems", H. 323, Feb. 1998, 125 pages.

J. Heinanen et al., "Assured Forwarding PHB Group," Network Working Group, Category: Standards Track (Jun. 1999).

McCloghrie et al., "Structure of Policy Provisioning Information (SPPI)", RFC 3159, Aug. 2001, 38 pages.

PacketCable, Cable Labs, http://www.packetcable.com, copyright 2000-2002.

PacketCableTM Dynamic Quality-of-Service Specification PKT-SP-DQOS-102-000818, 2000, Cable Television Laboratories, Inc., 211 pages.

Paul Roller Michaelis, "Speech Digitization and Compression", Int'l Encyclopedia of Ergonomic and Human Factors (W. Warkowski ed., Taylor & Francis 2001).

S. Blake et al., "An Architecture for Differentiated Services," Network Working Group, Category: Informational (Dec. 1998).

Sangeun Han et al., "Transmitting Scalable Video over a DiffServ network," EE368C Project Proposal (Jan. 30, 2001).

Schulzrinne. Providing Emergency Call Services for SIP-based Internet Telephony, http//www.softarmor.com/sipping/drafts/draft-schulzrinne-sip-911-00.txt, Jul. 13, 2000, pp. 1-13.

TechTarget, "voice activation detection," at http://searchnetworking.te...m/sDefinition/0,,sid7_gci342466.00.html (Jul. 1, 2002).

V. Jacobson et al., "An Expedited Forwarding PHB," Network Working Group, Category: Standards Track (Jun. 1999).

Wroelawski, "The use of RSVP with IETF Integrated Services", RFC 2210, Sep. 1997, 31 pages.

"Packet Loss and Packet Loss Concealment Technical Brief," Nortel Networks at http://www.nortelnetworks.com (2000).

"Telogy Networks' Voice Over Packet White Paper," Telogy Networks, Inc., available at http://www.telogy.com/our_products/golden_gateway/VOPwhite.html (Jan. 1998).

"Voice over packet: An assessment of voice performance on packet networks white paper," Nortel Networks, Publication No. 74007.25/09-01, at http://www.nortelnetworks.com (2001).

"Access for 9-1-1 and Telephone Emergency Services," American with Disabilities Act, U.S. Department of Justice (Jul. 15, 1998), available at http://www.usdoj.gov/crt/ada/911ta.htm, 11 pages.

Schulzrinne, "Emergency Call Services for SIP-based Internet Telephony," Internet Engineering Task Force (Mar. 25, 2001), pp. 1-17.

Le Boudec, Jean-Yves et al., slideshow entitled "Quality of Service in IP Networks (2)," Queue Management (undated), pp. 1-30.

RADVision, "SIP: Protocol Overview," (2001), pp. 1-16.

* cited by examiner

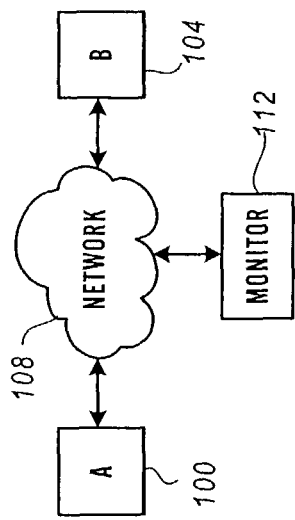
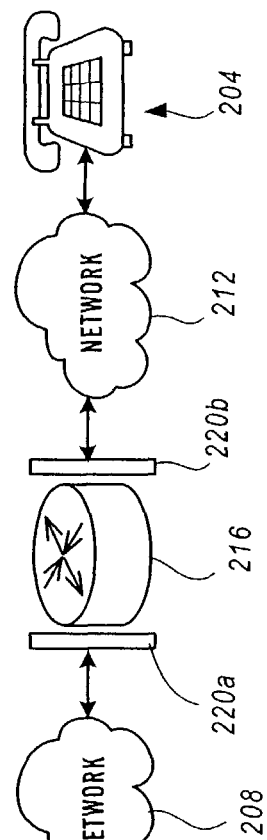
PRIOR ART
FIG. 1
FIG. 2

| SESSION IDENTIFIER ⌐500 | TRIGGERING ENDPOINT(S) ⌐504 | WHEN TRIGGERED ⌐508 | OTHER SESSION ENDPOINTS ⌐512 | OTHER INFORMATION ⌐516 |
|---|---|---|---|---|
|  |  |  |  |  |
|  |  |  |  |  |
|  |  |  |  |  |

| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
|---|---|---|---|---|---|---|---|---|---|---|---|---|---|---|---|---|---|---|---|---|---|---|---|---|---|---|---|---|---|---|---|
| V=2 | | P | | SUBTYPE=4 | | | | PT=APP=204 | | | | | | | | | | | | LENGTH | | | | | | | | | | | |
| SSRC | | | | | | | | | | | | | | | | | | | | | | | | | | | | | | | |
| NAME = "-AV-" | | | | | | | | | | | | | | | | | | | | | | | | | | | | | | | |
| CSRC | | | | | | | | | | | | | | | | | | | | | | | | | | | | | | | |
| METRIC MASK | | | | | | | | | | | | | | | | | | | | | | | | | | | | | | | |
| RECEIVED RTP PACKETS | | | | | | | | | | | | | | | | | | | | | | | | | | | | | | | |
| RECEIVED RTP OCTETS | | | | | | | | | | | | | | | | | | | | | | | | | | | | | | | |
| ROUND-TRIP TIME | | | | | | | | | | | | | | | | | JITTER BUFFER DELAY | | | | | | | | | | | | | | |
| LARGEST SEQUENCE JUMP | | | | | | | | LARGEST SEQUENCE FALL | | | | | | | | RSVP STATUS | | | | | | | | MAXIMUM JITTER (1st BYTE) | | | | | | | |
| MAXIMUM JITTER (LAST 3 BYTES) | | | | | | | | | | | | | | | | | | | | | | | | JITTER BUFFER UNDER-RUNS | | | | | | | |
| JITTER BUFFER OVER-RUNS | | | | | | | | SEQUENCE JUMP INSTANCES (FIRST 3 BYTES) | | | | | | | | | | | | | | | | | | | | | | | |
| SEQUENCE JUMP INSTANCES | | | | | | | | SEQUENCE FALL INSTANCES (FIRST 3 BYTES) | | | | | | | | | | | | | | | | | | | | | | | |
| SEQUENCE FALL INSTANCES | | | | | | | | IP ADDRESS (FIRST 2 BYTES) | | | | | | | | | | | | | | | | | | | | | | | |
| IP ADDRESS OF THE REMOTE END-POINT (LAST 2 BYTES) | | | | | | | | | | | | | | | | RTCP PORT OF THE REMOTE END-POINT | | | | | | | | | | | | | | | |
| FRAME SIZE | | | | | | | | | | | | | | | | TIME TO LIVE | | | | | | | | DIFFSERVE CODE POINT | | | | | | | |
| RTP PAYLOAD TYPE | | | | | | | | 802.1Q | | | | | | | | MEDIA ENCRYPTION | | | | | | | | NULL TERMINATION | | | | | | | |
| 802.1p | | | | | | | | | | | | | | | | | | | | | | | | | | | | | | | |

*FIG. 6*

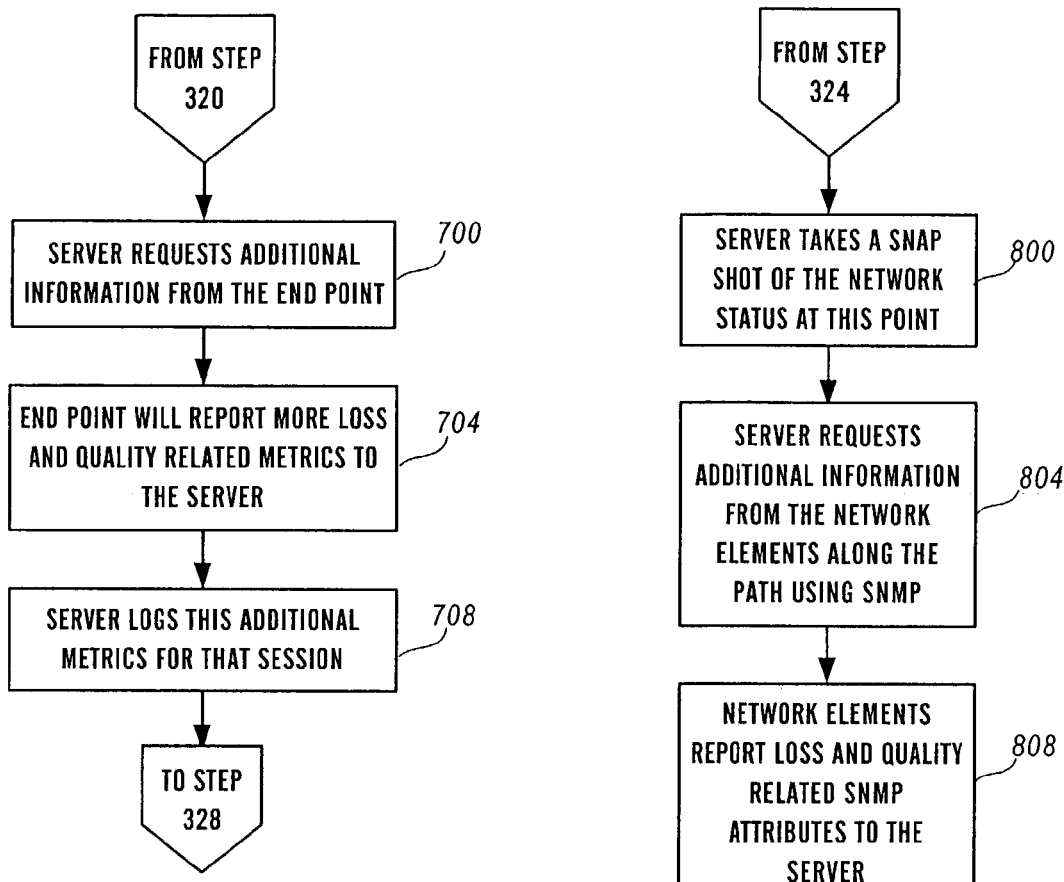
FIG. 7
FIG. 8
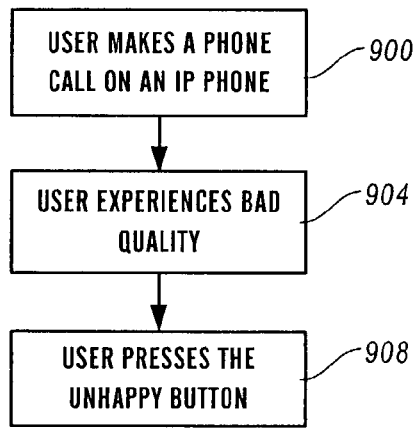
FIG. 9

INSTANTANEOUS USER INITIATION VOICE QUALITY FEEDBACK

CROSS REFERENCE TO RELATED APPLICATIONS

Cross-reference is made to copending U.S. application Ser. Nos. 10/028,874, filed Oct. 22, 2001, to Rankine et al., entitled "Real Time Control Protocol Session Matching"; 10/109,784, filed Mar. 29, 2002, to Chavez et al., entitled "Emergency Bandwidth Allocation with an RSVP-Like Protocol"; 10/262,005, filed concurrently herewith, to Hepworth et al., entitled "Voice Over IP Endpoint Call Admission", and 10/165,719, filed Jun. 7, 2002, to Krumm-Heller et al., entitled "Apparatus and Method for Automatically and Dynamically Reconfiguring Network Provisioning", each of which contains related subject matter and is incorporated herein fully by reference.

FIELD OF THE INVENTION

The present invention relates generally to data networks and specifically to voice communications over distributed processing networks.

BACKGROUND OF THE INVENTION

Distributed processing networks are being increasingly used for live voice communications between network nodes using Voice over IP or VoIP technology. In VOIP technology, after the speech is digitized, the digitized speech is divided into packets, each packet including a header, and a data payload of one to several frames of encoded speech. Distributed processing networks for delivering the packets to desired endpoints are typically designed to provide a Best Effort or BE single service model that does not discriminate in packet delivery between services and does not control service access or quality. Quality of Service or QoS architectures have been developed for BE environments to provide guaranteed transmission characteristics end-to-end such as available bandwidth, maximum end-to-end delay, maximum end-to-end delay variation (jitter), and packet/cell loss levels to provide continuous data streams suitable for real-time phone calls and video conferencing. Such QoS architectures include protocols such as the Resource ReSerVation Protocol or RSVP and the Real-Time Transfer Protocol or RTP.

RSVP is a signaling protocol that guarantees receivers a requested end-to-end QoS. RSVP serves as an internet signaling protocol through the transmission of QoS parameters. Under RSVP, an end point negotiates with the network to allocate or reserve protected resources for traffic that the end point will generate or receive. The two messages that perform the reservation request and installation are the Path and Resv messages. Robustness is achieved through maintaining a soft state network by transmitting periodic refresh messages to maintain a reservation and path state along the reservation path. If the intermediate nodes do not receive the refresh message, the reservation will time out and be deleted.

RTP is a voice bearer channel transfer protocol. RTP neither guarantees a QoS nor provides for resource reservations. RTP runs on the transport layer of the Open Systems Interconnection or OSI model and defines a session by two components, namely its profile and payload format where the payload is the data being transmitted. The payload format specifies the format of the data within the RTP packet such as encoding and compression schemes. RTP functions include loss detection for quality estimation and rate adaptation, sequencing of data, intra- and intermedia synchronization, session identification using a session id, source identification using a synchronization source id or SSRC, and basic membership information.

The Real-Time Control Protocol or RTCP, a companion protocol to RTP, is used by applications to monitor the delivery of RTP streams. The joint operation of RTP and RTCP is illustrated by FIG. 1. Referring to FIG. 1, media packets transmitted between A 100 and B 104 and vice versa during a session are formatted and transmitted (continuously or frequently) over network 108 according to RTP while additional performance information governing the communication fink (e.g., key statistics about the media packets being sent and received by each end point (A or B) such as jitter, packet loss, round-trip time, etc.) are collected by the end points and transmitted (discontinuously or less frequently) over the network 108 to one another and to a session monitor 112 according to RTCP using IP multicast, unicast, or dual unicast techniques. End points A and B are typically computational components but can be or include any other form of audio or video communications interface. The network monitor can be, for example, VoIP Monitoring Manager™ or VMM™ by Avaya, Inc. RTCP performance information is useful not only for the session participants, A and B, but also for a network monitor 112. Network administrators can use such information not only for network administration but also for network troubleshooting and management.

Under either protocol, VoIP introduces a whole new range of QoS problems which were not previously significant or, in some cases, even encountered in circuit-switched networks. Voice telephony depends upon reliable, low latency, real-time delivery of audio data. In VoIP, values for latency, packet loss, and jitter can increase substantially, particularly during periods of heavy network traffic, causing a user to experience a much poorer quality of communication (e.g., audio or video distortion, unacceptable levels of asynchronization between audio and video streams, etc.) than would be experienced if the call were made by a traditional circuit-switched telephony network.

When a user experiences a poor quality of communication quality, there is no simple, user friendly method for him to log the details of the call (number dialed, date, and time), and such details are typically lost. IP hard- and soft-telephones calculate, during a session, the values of latency, packet loss, and jitter. Some telephones, such as the Cisco IP Phone 7960™, permit a user to press a button and view the current values for latency, packet loss, and jitter. However, such telephones fail to record the details of the call. In fact, much of the data collected from the end point(s) by the voice quality monitoring system, such as the session monitor in RTCP, is typically discarded with only a generalized summary of the session being retained for later use by network administration personnel. The loss of such data can hinder later diagnosis of the problem.

Current voice quality monitoring systems lack the capability of detemining when a problem is occurring in order to take a snapshot of the network. Taking a snapshot of the network attributes at the instant that the voice quality degraded will aid in instantaneous troubleshooting of the network. The user best knows when they are experiencing poor audio and/or video quality at a specific instant in time; however, when the network administration person later wants to troubleshoot by having the user replace the call, the user often fails to experience the same problem(s). To make matters worse, most users either fail to report problems due to the inconvenience of lodging a complaint and/or are unable to fully report the problem due to the inability of remembering who and when they were calling at the time they had the problem.

SUMMARY OF THE INVENTION

These and other needs are addressed by the various embodiments and configurations of the present invention. The present invention is generally directed to a user- or automatically-generated trigger indicating performance problem(s) (e.g., voice quality distortion or degradation) in communications between network elements or nodes. The invention is particularly useful in VoIP applications. As used herein, a "network node" refers to a point in a network at which one or more functional or computational units connect one or more channels and/or data circuits. Examples of network nodes comprise a telephone, a soft phone, an IP hard phone, a personal or laptop computer, a Personal Digital Assistant or PDA, a pager, and a wireless phone.

In one embodiment, a method for monitoring a network, comprises the steps of:

(a) providing first and/or second network nodes, the first and second network nodes communicating with one another in a session;

(b) receiving a message from one or both of the first and second network nodes, the message indicating a service problem with the session; and (c) in response to the message, performing one or more of the following operations: (i) reconfiguring one or more functional or computational resources or attributes thereof (e.g., attributes such as packet service class, packet priority level, encryption algorithm, etc.) in the network; (ii) varying a sampling or reporting frequency of one or more session-related performance attributes (e.g., performance attributes such as jitter, jitter buffer delay, packet or packetization loss, available bandwidth, and latency) associated with the network; (iii) altering the types of session-related performance attributes being collected regarding the network; and (iv) collecting session-related information from nodes other than the first and second network nodes (e.g., from switches and routers and/or interfaces associated therewith). A "session" refers to a set of communications exchanged between two or more functional or computational units of a network.

The various embodiments of the present invention can have a number of advantages. First, the present invention can provide a simple, user friendly, and convenient method for a caller to report voice quality degradation instantaneously (during a call), thereby encouraging callers to report performance problems with more regularity. Second, the invention can provide the voice quality monitoring system with a trigger to take a snapshot of the network performance attributes, request more troubleshooting information from all the systems participating in the voice call, and retain the collected network performance attributes for later use by network administrators. Detailed logging for problems in a call during a call is far more desirable than waiting until after the call is over. Waiting until after the call requires identification of the problem call and then finding the call in a voluminous log output by a monitor that is logging everything. Third, the invention can provide useful metrics for performance analysis, e.g., the number of unhappy calls per time period can be determined. Fourth, the invention can notify network administration of a problem while the problem is occurring. Fifth, the invention can be configured to be relatively nonintrusive on the network. A trigger-based system only generates traffic when a predetermined event occurs (the frequency of occurrence of which is configurable and controllable) while a polling system generates traffic continuously. Sixth, the invention can be used to determine for each caller what are the desirable characteristics for that caller. As will be appreciated, callers generally are willing to accept differing degrees of voice distortion in a call. Seventh, the invention can be user configured to notify users of when to terminate a call due to network congestion. This is done by providing the user with user-configurable performance thresholds.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 1 is a block diagram of a session;

FIG. 2 is a block diagram of an architecture according to an embodiment of the present invention;

FIG. 6 depicts a first configuration of a packet format compatible with the embodiments of the present invention;

FIG. 7 is a flowchart of an embodiment of the present invention;

FIG. 8 is a flowchart of an embodiment of the present invention;

FIG. 9 is a flowchart of an embodiment of the present invention; and

DETAILED DESCRIPTION

Figure 3:
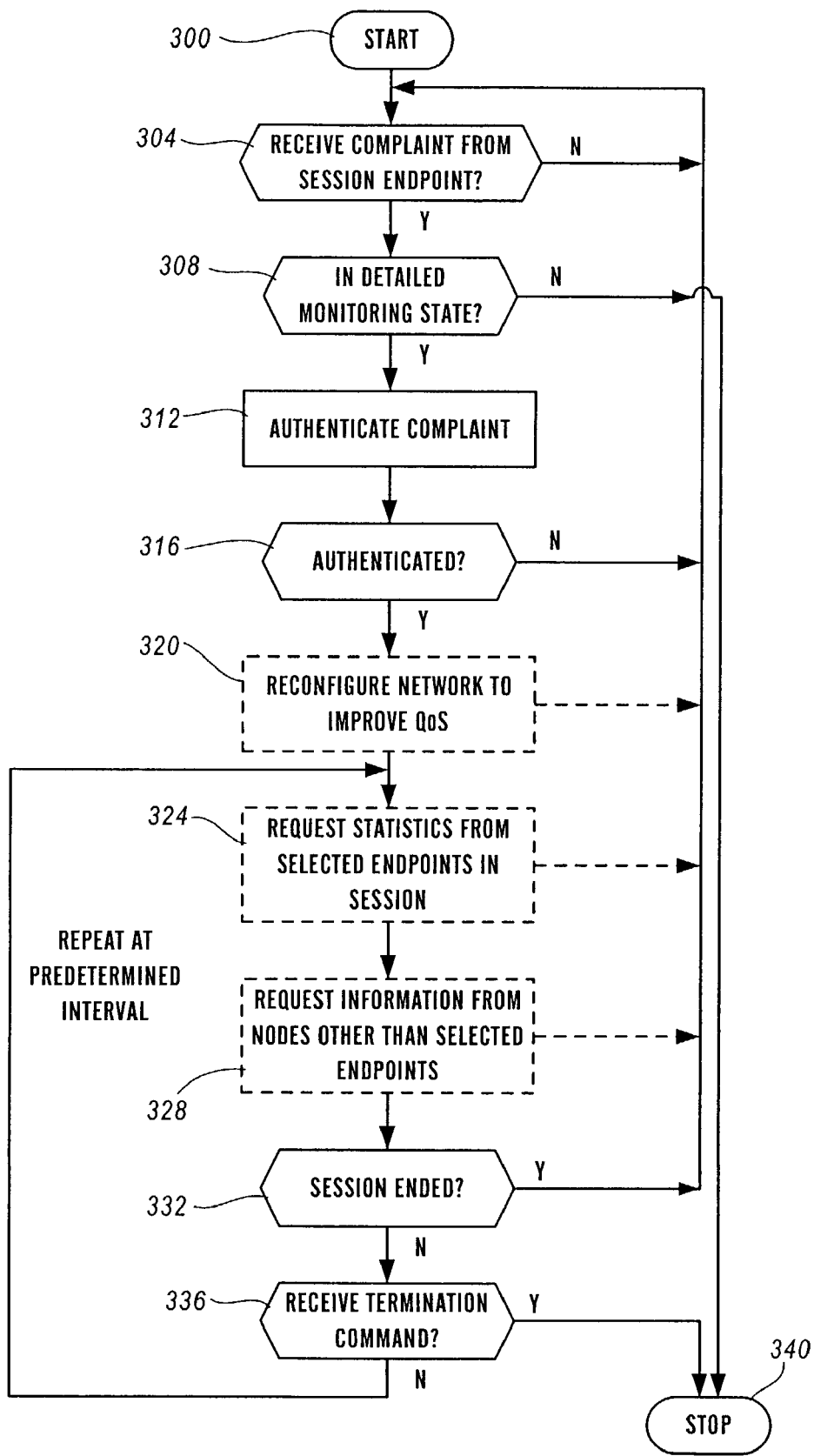
FIG. 3 is a flowchart of an embodiment of the present invention.

FIG. 2 depicts a VoIP architecture according to an embodiment of the present invention. The architecture includes a first end point 200, which, for illustration purposes, is configured as an IP soft-phone, a second end point 204, which, for illustration purposes is configured as an IP hard-phone, first and second subnetworks 208 and 212, a router 216 having first and second interfaces 220a and 220b, and a session monitor 224. As will be appreciated, the first and second end points 200 and 204 can be any communication device, such as a telephone, a soft phone, an IP hard phone, a personal or laptop computer, a PDA, a pager, and a wireless phone. It is further to be understood that the architecture can include any number of subnetworks and routers, depending on the application.

As depicted, the first end point 200 is a personal computer including a computer display monitor 228 and a computer comprising memory 232 and a processor 236. The memory 232 includes a performance monitoring agent 240 to collect session-related information, such as latency, packet loss, jitter, available bandwidth, and jitter buffer delay and forward the information to the other end point 204 and monitor 224. As will be appreciated, the second end point 204 preferably includes a performance monitoring agent as well.

The performance monitoring agent 240 is configured to cause entry into a detailed monitoring state either automatically if session quality falls below user-defined levels and/or in response to a request by a user of the end point. As discussed below, the detailed monitoring state causes the end point to collect additional session-related metrics or statistics and/or transmit the metrics or statistics to the monitor more frequently. The detailed monitoring state ends when the session ends or when the user requests termination of the state.

The session monitor 224 collects session-related information from the various end points involved in one or more concurrent sessions. This is normally effected by the session monitor 224 being part of a multicast group or by dual unicast techniques in which the end points are told the address of the session monitor to which the second RTCP stream is to be sent, prior to the start-up of an RTCP session. The session monitor 224 includes in memory 244 a statistic collection agent 248 to collect and store information from the end points, a network reconfiguration agent 252 to reconfigure resources of the network to meet QoS requirements for a session, and a database 256 comprising statistics and other information collected from the end points. Other components of the session monitor 224 can include those currently available in products such as VoIP Monitoring Manager™ by Avaya, Inc.

The session monitor 224 could be implemented as a Simple Network Management Protocol or SNMP extension agent. The monitor 224 listens on a configurable port number for the RTCP packets from the end points 200 and 204 and stores them in database 256 in the SNMP Management Information Base or MIB. Making the data available via SNMP means that other third party network management applications can access the data, providing integration with a customer's standard environment. The data is stored in two MIBs, namely a current RTP MIB (which includes information for active RTP sessions) and a historical RTP MIB (which includes information for inactive, historical RTP sessions).

Upon receipt of a notification from an end point that the detailed monitoring state is in effect, the monitor can perform any one of or a combination of actions. The monitor can reconfigure and/or reallocate network resources and/or attributes to provide a higher QoS for the session. The monitor can request additional statistics from intermediate network nodes, such as routers and switches (and/or their associated interfaces). Finally, the monitor can save in the current and later in the historical MIB more detailed session metric or statistical information received from one or both of the end points. The detailed information is not discarded at the end of the session to provide a snapshot of the network around the time of entry into the detailed monitoring state for later use by network administration personnel.

A user of the monitor 224 can obtain a multitude of information through appropriate queries. The user can obtain information regarding each end point, information regarding specific RTP sessions between end points (e.g., whether or not a session end point triggered the detailed monitoring state, the end point triggering the detailed monitoring state, when the detailed monitoring state was triggered, the codec used, the RSVP status, the session start and end times, the communications controller with which the end point is registered), and a list of sessions with levels of jitter, jitter buffer delay, latency, available bandwidth, and/or packet loss above certain user-defined levels.

Figures 4, 5:
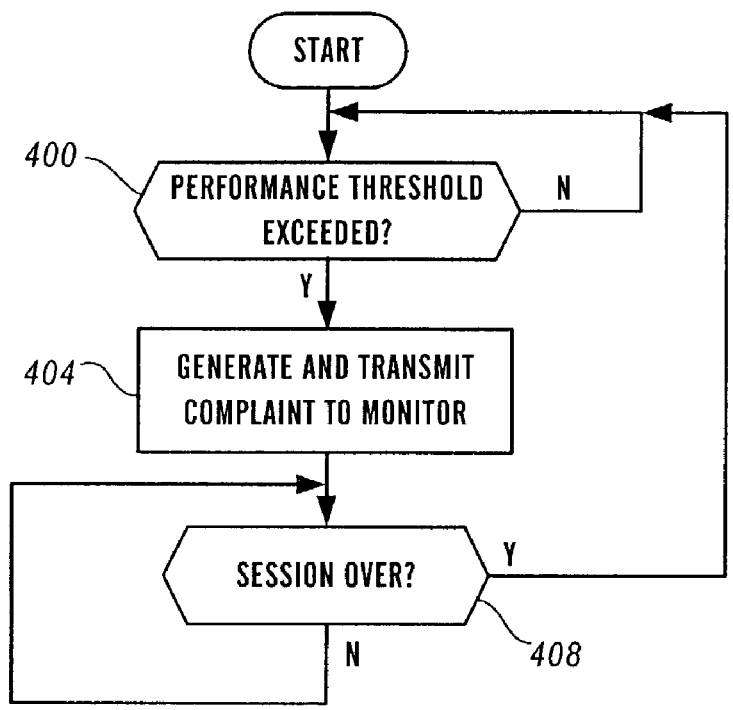
FIG. 4 is a flowchart of an embodiment of the present invention.
FIG. 5 is an output table according to an embodiment of the present invention.

FIG. 5 is illustrative of the additional information that is available to network administration personnel according to the present invention. Referring to FIG. 5, the monitor can collect, for each session identifier 500, the identities 504 of the end points (e.g., endpoint SSRC's) to the same and/or different sessions requesting entry into the detailed monitoring state due to a poor session quality, the times 508 for each session when the detailed monitoring state was first requested (if appropriate), the identities 512 (e.g., endpoint SSRC's) of the other end points in each session, and any other desired information 516. This table permits administration personnel to view all sessions conducted during a selected time period and for the sessions identify time periods when a number of sessions reported problems with session quality.

The operation of the performance monitoring agent 240, statistic collection agent 248, and network reconfiguration agent 252 will now be discussed with reference to FIGS. 2 and 3. The algorithm starts in step 300 in which relevant variables are instantiated. As packets are received from each of the end points 200 and 204, the monitor 224 parses through each of the packets in step 304 and determines, on a packet-by-packet basis, if a detailed monitoring state flag is set. If the flag is not set, the monitor 224 proceeds to the next packet and repeats step 304. If the flag is set, the monitor 224 proceeds to step 308.

As shown in steps 900, 904, and 908 of FIG. 9, the end point sets the flag in response to a user-initiated QoS complaint or request for more detailed performance monitoring due to an unacceptably low session quality. The end point can be configured in a number of ways to permit the user to initiate the complaint or request. For example, the end point can have a dedicated detailed monitoring state key, a soft or programmable key configured to trigger the detailed monitoring state, or one or a sequence of characters entered at the same or different times and associated with a request for entry into the detailed monitoring state.

The packet containing the flag can be configured in accordance with a standard protocol such as RTCP or a proprietary or nonstandard protocol. For example, the flag can be in the APP section of the RTCP packet.

In step 308, the monitor 204 determines if requests for entering the detailed monitoring state are being accepted. Situations in which the system is not allowing the session monitor and end points to enter into a detailed monitoring state include, for example, situations in which there is inadequate memory space available in the memory of the monitor to receive the additional information collected in that state, the monitor has received too many such requests in a predetermined period of time, the network of which one or both of the end points is a part is too congested to support the additional network traffic created by the end point(s) (e.g., the average packet round-trip time for the same or a number of concurrent sessions equals or exceeds a predetermined packet round-trip time), and the monitor in the detailed monitoring state. When such requests are not being accepted, the session monitor 224 returns to step 304, and when such requests are being accepted, the session monitor 224 proceeds to step 312.

In step 312, the monitor 224 authenticates the packet. The monitor confirms that the user of the end point is a legitimate requester (and is not simply trying to obtain a higher packet priority by generating a request for entry into the detailed monitoring state) by confirming that the session id and/or source id (e.g., SSRC) in the packet matches the session id and/or source id of an active session. In step 316, the monitor 224 determines whether or not the packet was successfully authenticated. If not, the monitor 224 returns to step 304 and parses the next packet. If so, the monitor 224 performs one or more of steps 320, 324, and 328 discussed below (depending on the system configuration).

In step 320, the network reconfiguration agent 252 automatically and dynamically reconfigures the network provisioning. This can be done in many different ways. For example, the agent 252 could cause reconfiguration of the switching/routing network as described in copending U.S. Application entitled "Apparatus and Method for Automatically and Dynamically Reconfiguring Network Provision"

referred to above. In that event, a rule engine (not shown) would be used to determine whether a traffic problem has arisen within the network that requires reconfiguration and, based on the time of day, how to reconfigure the network to take into account such operations as data backups or if during normal business hours the need to provide special treatment for voice traffic being carried by packets through the network, and a maintenance server (not shown) would contain various tables providing differing network configurations that can be put into place upon requests by the agent 252 Ways to reconfigure the network include providing a different service class and/or priority level to the packets, switching on 802.1Q and setting the priority tag or setting a new Differentiated Services Code Point or DSCP, make the session into a guaranteed service, changing the codec at the end point(s) such as by changing from a high bandwidth encoding algorithm such as G711 (which outputs at 3.4 kHz about 56 or 64 Kbps) to a lower bandwidth algorithm such as G729 (which outputs at 3.4 kHz about 8 Kbps) or G723 (which outputs at 3.4 kHz at about 5.3 or 6.4 kbps), and switching the packets onto the Public Switched Telephone Network or PSTN. After the agent 252 completes step 320, the monitor 224 can return to step 304 and parse through other packets, proceed to step 332, or perform one or more of the other steps 324 and 328.

In step 324, the statistic collection agent 248 requests additional types of statistics and/or statistics at a different frequency from one or more of the end points in the session. This process configuration in which additional types of statistics are requested is shown in FIG. 7. In FIG. 7, the agent 248 in step 700 requests from one or both endpoints additional information, causing the endpoint in step 704 to report more loss and quality-related metrics to the agent 248, and logs the additional metrics for that session in memory in step 708.

Additional types of statistics could include received RTP packets (a variable that is cumulative for the session and is reset to zero at the start of each new RTP session), received RTP octets (a variable that is cumulative for the session and is reset to zero at the start of each new RTP session), round trip time (a variable expressed in units of milliseconds that is reset to zero at the start of each new session), jitter buffer delay (a variable representing the delay imparted on the bearer channel by the jitter buffer at an end point and is expressed in milliseconds), largest sequence jump (a variable representing the maximum number of consecutive packets lost during the respective reporting interval), largest sequence fall (a variable representing the number of packets after an out of order packet is received from when the out of order packet was expected to be received); jitter (a variable indicating a level of distortion of the interpacket arrival times compared to the interpacket times of the original transmission), maximum jitter (a variable representing the maximum value of the jitter seen in a respective reporting interval), number of jitter buffer under-runs (a variable representing the number of times during a contact or session that the jitter buffer become empty), number of jitter buffer over-runs (a variable representing the number of times during a contact or session that the jitter buffer was smaller than a pre-determined level), the number of sequence jump instances (a variable representing how many times during a pre-determined reporting interval at least one packet was lost), the number of sequence fall instances (a variable representing how many times during a contact or session at least one packet was out of order), echo tail length (a variable representing the length of echo cancellation processing determined by the distance between the gateway and the endpoint), packet loss burst size (a variable indicating the maximum number of consecutive packets lost in the respective reporting interval), the number of out-of-order packets (a variable representing the number of packets received out-of-order in the respective reporting interval), the out-of-order distance (a variable representing the number of packets after an out-of-order packet was received from when it was expected to be received), RSVP status (the RSVP status variable reports the state of RSVP protection of the receiver end point's session (e.g., RTP session) only (e.g., states can include receiver RSVP not in use, receiver RSVP disabled, receiver RSVP installation pending, receiver RSVP reservation failed, and receiver RSVP reservation installed); call state and sender channel state are not reported by the RSVP status field), the DSCP (a variable that is the value of the IP DSCP field of the incoming RTP packets), available bandwidth (a variable representing available (unused) and/or unavailable (used) bandwidth), IP address and port number of the remote end point (a variable representing the IP address and port (e.g., RTCP port) of the remote end point that is participating in the session), payload type (a variable representing the payload type (e.g., RTP payload type as defined in RFC 1890), which, for example, specifies the codec being used for audio streams), frame size (a variable representing the frame size (e.g., in milliseconds) for which the codec is configured), gatekeeper IP address (a variable representing the IP address of the gatekeeper); trace route hop count (a variable representing the number of hops between the two endpoints participating in a session), time to live (a variable representing the value of the TTL field of the incoming RTP packet), Differentiated Service Code Point or DSCP, 802.1p (a variable representing the value of the 802.1p field of the incoming RTP packet) and 802.1Q (a variable representing the value of the 802.1Q field of the incoming RTP packet), media encryption (a variable indicating whether or not media encryption is enabled or disabled), and trace route per hop (a variable representing the network hops to the remote end point of the bearer channel and the round trip delay to each hop in milliseconds (e.g., the trace route information in the APP packet is the sequence of integers representing the IP address (in network byte order) for each network hop and the round trip delay to that hop in milliseconds).

Alternatively, the end point can simply forward such information at the different frequency automatically upon receipt of the request from the user to enter into the detailed monitoring state. Regarding the frequency at which RTCP packets are exchanged by the end points and/or sent to the agent 248, the frequency is typically increased to provide a higher sampling granularity. For example, a typical packet exchange rate is at a minimum of 5 seconds. In the detailed monitoring state the exchange rate could be increased to once every second.

FIG. 6 shows a first configuration of a format of an RTCP Application or APP packet that can be used with the present invention to convey performance metrics whether or not in the detailed monitoring state. As will be appreciated, the packet format, in whole or part, may be used with other suitable protocols. Referring to FIG. 6, the packet format comprises fields corresponding to packet length 600, SSRC 604, name 608, CSRC 610, a bit mask 612 indicating the metrics contained in the packet, received RTP packets 616, received RTP octets 620, round-trip time 624, jitter buffer delay 628, largest sequence jump 630, largest sequence fall 632, RSVP status 634, maximum jitter 636 and 638, jitter buffer under-runs 640, jitter buffer over-runs 642, sequence jump instances 644 and 646, sequence fall instances 648 and 652, echo tail length 654, IP address 656, Ip address of the remote end-point 658, RTCP port of the remote end-point 660, RTP payload type 662, frame size 664, time to live 666, Differential Service Code Point 668, 802.1p 670, 802.1Q 672, media encryption 674, and null termination 676.

Figure 10:
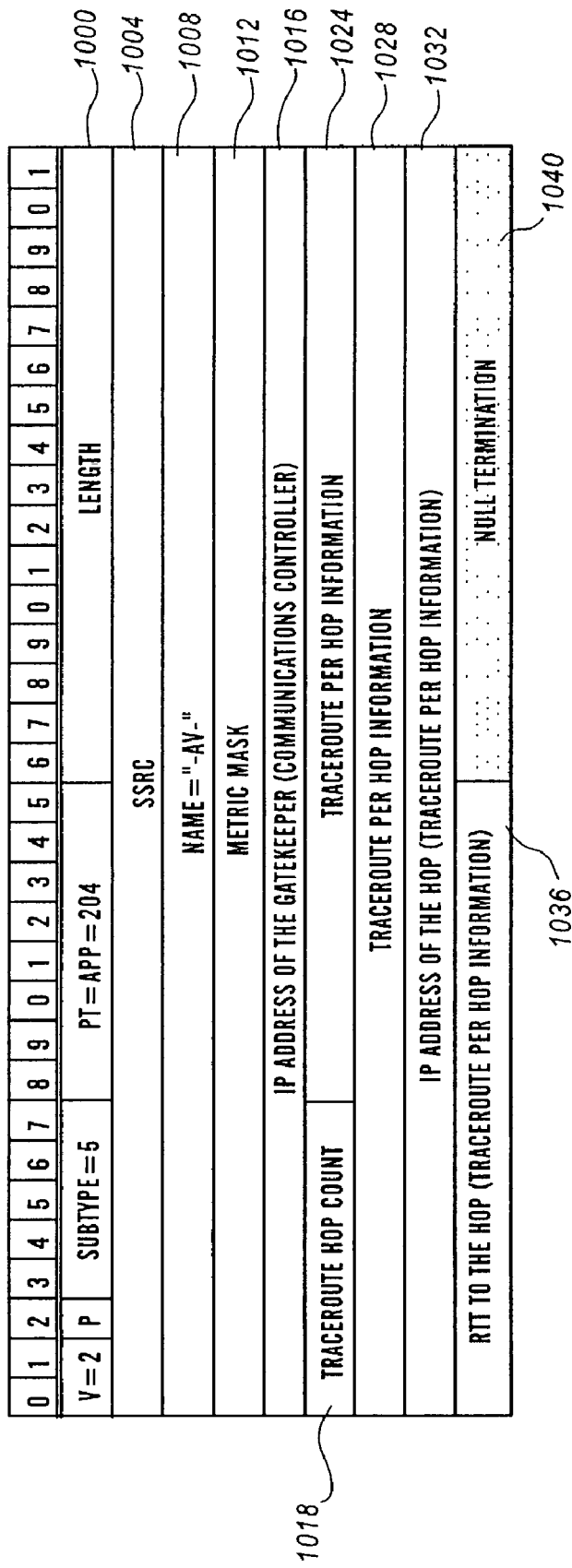
FIG. 10 depicts a second configuration of a packet format compatible with the embodiment of the present invention.

FIG. 10 shows a second configuration of an RTCP Application or APP packet. The packet format comprises fields corresponding to packet length 1000, SSRC 1004, name 1008, bit mask 1012, IP address of the gatekeeper or the communications controller 1016, trace route hop count 1018, trace route per hop information 1024 and 1028, IP address of the corresponding hop 1032, round-trip-time or RTT to the hop 1036, and null termination 1040.

The packet of either configuration will have a variable length due to the nature of the metrics that it contains. The numbers and identities of metrics in the packet (and the values of the field indicators in the bit mask) depend upon whether the detailed monitoring state is in effect (certain metrics are not sent when the detailed monitoring state is not in effect) and/or the frequency of transmission of every metric. In the bit mask each metric has a corresponding bit or field indicator. If a bit is set to 1 the APP packet contains the corresponding metric. If the bit is set to 0, the APP packet does not contain the corresponding metric or there is no metric to report that corresponds to the bit. Another way to configure the RTCP packet to contain the desired metrics is to extend the sender and receiver report blocks or use the PRIV SDES packet extensions.

As will be appreciated, other packet formats may be used depending on the protocol in use.

After completing step 324, the monitor 224 can return to step 304, proceed to step 332, or perform one or more of the other steps 320 and 328.

In step 328, the agent 248 requests specified information from the interface(s) 220 of the routers 216 (such as interface 220a of router 216) and switches. The information comprises the queue length at the interface/router, whether the interface/router is dropping packets (due for example to excessive delay, duplication, or fragmentation), if so how many and why. The information can be requested by known techniques using any standard protocol, such as Internet Control Message Protocol or ICMP and/or SNMP.

FIG. 8 shows one process configuration for performing step 328. In step 800 the agent 248 generates various requests to take a snapshot of the network status when the request is received from an endpoint. In step 804, the agent 248 requests additional information from the network elements or nodes along the path using a suitable protocol such as SNMP. In step 808, the network elements report loss- and quality-related attributes to the to the agent 248, and in step 812 the agent 248 logs the network state information for that session in memory.

After completing step 328, the monitor 224 can return to step 304, proceed to step 328 or perform one or more of the other steps 320 and 324.

In step 332, the monitor 224 determines whether or not the session is ended. When the session is over, the monitor 224 returns to step 304 and parses through the next packet. When the session is not over, the monitor proceeds to step 336.

In step 336, the monitor 224 determines whether or not it has received a command to terminate the detailed monitoring state on all sessions. The statistic collection agent 248 can cause termination when, for example, network congestion (e.g., one or more of the metrics referred to above) has met or exceeded predefined levels or the monitor's 224 available memory has decreased to predetermined levels (or the size of the database 256 has increased to predetermined levels). When no termination command has been received, the agent 248 returns to step 324 or 328. When a termination command has been received, the agent proceeds to step 340.

FIG. 4 shows an algorithm for a performance monitoring agent 240 that automatically generates a request to enter the detailed monitoring state when one or more of the metrics referred to above) has met or exceeded predefined levels. In step 400, the agent 240, after receiving an RTCP packet from the other end point, determines whether the selected metric(s) in the packet meet or exceed predefined levels. When the levels are not met or exceeded, the agent 240 repeats step 400 for the next RTCP packet to be received. When the levels are met or exceeded, the agent 240 in step 404 generates and transmits to the monitor 224 a request to enter into the detailed monitoring state.

In step 404, the agent 240 thereafter ignores later events in which the selected thresholds are met or exceeded until the session is over. In step 408, the agent 240 determines when the session is over. After the session is over, the agent 240 returns to step 400 to reinitiate the detailed monitoring state, if appropriate, in a later session.

Alternatively, the automatic entry into the detailed monitoring state can be initiated by the statistic collection agent 248, which is receiving the necessary metrics from the agent 240.

A number of variations and modifications of the invention can be used. It would be possible to provide for some features of the invention without providing others.

For example in one alternative embodiment, the session monitor 224 is co-resident on one of the end points 200 or 204.

In yet another embodiment, a server (not shown) can be used as a proxy between the monitor 224 and the end points 200 and 204. The server reduces the amount of traffic to the monitor 224 by performing large data downloads and extensive parsing of the MIB data stored on the monitor 224. The server resides on the same Local Area Network or LAN (and typically the same personal computer) as the monitor 224. As will be appreciated, the monitor 224 can be on a remote network or a dial-up link. By performing the large data acquisition and search tasks on the server the traffic to the monitor 224 can be dramatically reduced. In one implementation, the server publishes a Java remote method invocation interface for the monitor 224 and accesses the RTCP data gathered by the monitor via the SNMP interface to the MIB.

In yet another alternative embodiment, the monitor 224 ignores packets having the detailed monitoring state flag set when the session corresponding to the packet containing the set flag is already in the detailed monitoring state. It is to be expected that users out of frustration will continue to send requests for the detailed monitoring state to be invoked if the poor session quality continues. The number of instances (and times of the instances) of receipt of a request for a session can however be tracked in the output table of FIG. 5.

In another alternative embodiment, requests for entry into the detailed monitoring state are ignored when predetermined or predefined metrics or statistics are met or exceeded by the corresponding session attributes. This QoS baseline is used to limit the numbers of requests acted upon to only those corresponding to sessions which, objectively, are inferior based on the predefined metrics or statistics.

In yet another embodiment, the monitor 224 forwards an alarm to network administration personnel when a detailed monitoring state request is received from an end point. In this way, administration personnel could initiate troubleshooting of the systemic problems during the session rather than some time after the session has ended.

In yet a further embodiment, the end point, when in the detailed monitoring state, sends to the monitor 224 a standard packet (a packet containing standard metrics sent when the system is not in the detailed monitoring state) at one interval and a nonstandard packet containing both standard and nonstandard (additional) metrics at a different interval.

In a further embodiment, the monitor 224 sets a flag associated with the session at least part of which was in the detailed monitoring state to retain the collected metrics from a session after the session has ended. In this embodiment, little, if any, of the collected information for the entire session (before and after receipt of the message) is discarded when the session summary is prepared and stored. In this manner, valuable information is not lost on sessions having user reported problems.

In a further embodiment, one or more of the agents 240, 248, and 252 are configured as a logic circuit such as an Application Specific Integrated Circuit.

In another embodiment, the algorithms described herein are used with other standard or proprietary protocols besides RSVP, RTP, and/or RSVP. For example, the present invention can be used in not only packet-switched but also circuit-switched networks where quality may be a problem. In a circuit-switched network, a user could press a key or series of keys (providing one or more DTMF digits) and notify network administration that a telephone problem has been encountered by a customer.

In yet another embodiment, the detailed monitoring state can be toggled on and off by the user of the end point. When service quality is poor, the user can toggle the detailed monitoring state on and when the service quality improves to acceptable levels the user can toggle the detailed monitoring state off. The embodiment can be configured as hitting the same key or inputting the same character sequence or as hitting different keys or inputting different character sequences. In this embodiment, it is desirable to have a visual indicator of whether or not the end point is in the detailed monitoring state.

In yet another embodiment, the detailed monitoring state is automatically terminated when the agent 240 and/or agent 248 determine, based on one or more selected metrics, that the QoS of the session has returned to acceptable (predetermined) levels.

In yet another embodiment, a computer readable medium containing instructions to perform the steps of the method(s) described herein may be provided.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for monitoring a network, comprising:
 (a) providing at least first and second network nodes, the first and second network nodes communicating with one another in a session;
 (b) while the session is in progress, receiving a message from at least one of the first and second network nodes, the message indicating a Quality of Service or QoS problem with the session and the message being generated in response to a user determining that QoS is not satisfactory during the session and then providing an input to at least one of the first and second network nodes; and
 (c) in response to receiving the user initiated message related to the QoS problem and while the session is in progress, performing at least one of the following substeps:
  (i) reconfiguring one or more resources in the network, said reconfiguring step being at least one of (A) causing at least one of the packets associated with the session and transmitted by the at least one of the first and second network nodes to use a different Differentiated Services Code Point, (B) converting the session from an unguaranteed service into a guaranteed service when the QoS problem is caused by packet traffic, and (D) switching the contents of at least one of the packets associated with the session onto a circuit-switched network;
  (ii) varying a sampling frequency of one or more session-related performance attributes associated with the network;
  (iii) altering the types of session-related performance attributes being collected regarding the network; and
  (iv) collecting session-related information from nonparticipant nodes other than the at least first and second network nodes, the nonparticipant nodes not being involved in the session.

2. The method of claim 1, wherein the message is generated in response to tactile input from the user and further comprising:
 authenticating the message before step (c); and
 providing the user with a plurality of the following: information regarding the other of the at least first and second nodes, whether or not the first and/or second node triggered the message, which of the first and/or second node triggered the message, a codec used when the message was generated, the Reservation Protocol status, the start and/or end time of the live voice session, the communications controller with which a selected one of the first and second node is registered, and a list of live voice sessions with corresponding values for jitter, jitter buffer delay, latency, available bandwidth, and/or packet loss above a selected level.

3. The method of claim 1, wherein, within a selected period of time, a number of service problem messages associated with a plurality of sessions are received and further comprising before step (c):
 determining whether one or more of the following conditions is true: (i) available memory space for storing session-related information at least one of equals and exceeds a predetermined memory level; (ii) the number of the service problem messages at least one of equals and is less than a predetermined number of messages; (iii) one or more performance attributes associated with two or more concurrent sessions at least one of equals and is less than predetermined levels; and (iv) one or more performance attributes associated with the live voice session indicate an acceptable QoS for the live voice session;

when the one or more of the following conditions is true, performing step (c);

when none of the one or more of the following conditions is true, not performing step (c); and terminating step (c) when network congestion has met or exceeded predefined levels, in response to user input a further message is generated requesting termination of step (c), when one or more performance attributes associated with the live voice session indicate an acceptable QoS for the live voice session, and/or when available memory has decreased to predetermined levels.

4. The method of claim 1, wherein substep (i) is performed.

5. The method of claim 4, wherein substep (i) comprises a plurality of the following substeps:

assigning a different service class to at least one of a plurality of packets associated with the session;

assigning a different priority level to at least one of the plurality of packets associated with the session;

causing at least one of the plurality of packets to use a different Differentiated Services Code Point;

making the session into a guaranteed service;

changing the codec of at least one of the first and second nodes; and switching at least one of the plurality of packets onto a circuit switched network.

6. The method of claim 1, wherein substep (ii) is performed.

7. The method of claim 6, wherein a first sampling frequency used before the message is received in step (b) is less than a second sampling frequency used after the message is received in step (b).

8. The method of claim 1, wherein substep (iii) is performed.

9. The method of claim 8, wherein a first type of session-related performance attributes collected before step (c) comprises a plurality of a packetization loss associated with the session, an actual and/or average jitter buffer delay associated with at least one of the first and second network nodes, jitter associated with the session, available bandwidth during the session, and an actual and/or average round-trip time associated with session-related packets and wherein a second type of session-related performance attributes collected after step (c) comprises at least four of the following: a total number of received packets associated with the session, a total number of received octets associated with the session, an actual and/or average round-trip time of at least one packet associated with the session, an actual and/or average jitter buffer delay associated with at least one of the first and second network nodes, a packetization loss associated with the session, a packet loss burst size associated with the session, a number of out of order packets associated with the session, an out of order distance associated with the session, jitter associated with the session, available bandwidth during the session, largest sequence jump associated with the session, largest sequence fall associated with the session; maximum jitter associated with the session, number of jitter buffer under-runs associated with the session, number of jitter buffer over-runs associated with the session, a number of sequence jump instances associated with the session, a number of sequence fall instances associated with the session, trace route hop count associated with the session, time to live associated with the session, trace route per hop associated with the session, and echo tail length associated with the session.

10. The method of claim 1, wherein substep (iv) is performed.

11. The method of claim 1, wherein substep (iv) comprises:

contacting at least one of a router and switch to obtain queue-related information, the queue related information comprising a plurality of a queue length, whether the at least one of a router and switch is dropping packets, a number of packets being dropped, and why packets are being dropped.

12. The method of claim 1, further comprising:

in response to step (b), forwarding a problem notification message to an address associated with network administration.

13. The method of claim 1, further comprising:

when a performance level falls below a specified threshold, setting a flag associated with the session, wherein the flag causes retention of predetermined types of collected performance attributes associated with the session and further comprising:

parsing through each packet received in the live voice session and determining, on a packet-by-packet basis, whether the flag is set.

14. The method of claim 1, further comprising:

receiving from the at least one of the first and second network nodes a message indicating that service problem has lessened or ceased.

15. The method of claim 1, wherein in the session the communications between the first and second network nodes are derived from voice communications.

16. A computer readable medium containing processor-executable instructions that, when executed, perform the steps of claim 1.

17. A logic circuit configured to perform the steps of claim 1.

18. A system for monitoring a network, comprising:

(a) an input operable to receive a message from at least one of first and second network nodes, the first and second network nodes communicating with one another in a session and the message indicating a service problem with the session, the message being generated in response to a user determining that QoS is not satisfactory during the session and then providing an input to at least one of the first and second network nodes; and (b) a statistic collection agent operable to cause, in response to receiving the user initiated message and during the session, at least one of the following operations:

(i) reconfiguration of at least one of the first and second network nodes, said reconfiguration comprising at least one of (A) causing at least one of the packets associated with the session to use a different Differentiated Services Code Point, (B) converting the session from an unguaranteed service into a guaranteed service when there is a packet traffic problem, and (D) switching the contents of at least one of the packets associated with the session onto a circuit-switched network;

(ii) variation of a sampling frequency of one or more session-related performance attributes associated with the network;

(iii) alteration of the types of session-related performance attributes being collected regarding the network; and (iv) collection of session-related information from nonparticipant nodes other than the at least first and second network nodes, the nonparticipant nodes not being participants in the session.

19. The system of claim 18, wherein the message is generated in response to tactile input from the user and wherein the statistic collection agent is operable to cause authentication of the message before causing performance of one or more of operations (i)-(iv) and to provide the user with a plurality of the following: information regarding the other of the at least first and second nodes, whether or not the first and/or second node triggered the message, which of the first and/or second node triggered the message, a codec used when the message was generated, the Reservation Protocol status, the start and/or end time of the live voice session, the communications controller with which a selected one of the first and second node is registered, and a list of live voice sessions with corresponding values for jitter, jitter buffer delay, latency, available bandwidth, and/or packet loss above a selected level.

20. The system of claim 18, wherein, within a selected period of time, a number of service problem messages associated with a plurality of sessions are received and wherein the statistic collection agent is operable, before causing performance of one or more of operations (i)-(iv), to (a) determine whether one or more of the following conditions is true: (i) available memory space for storing session-related information at least one of equals and exceeds a predetermined memory level; (ii) the number of the service problem messages at least one of equals and is less than a predetermined number of messages; (iii) one or more performance attributes associated with two or more concurrent sessions at least one of equals and is less than predetermined levels and (iv) one or more performance attributes associated with the live voice session indicate an acceptable QoS for the live voice session; (b) when the one or more of the following conditions is true, cause performance of at least one of operations (i)-(iv); (c) when the one or more of the following conditions is not true, not cause performance of the at least one of operations (i)-(iv); and (d) terminate one or more of operations (i)-(iv) when network congestion has met or exceeded predefined levels, in response to user input a further message is generated requesting termination of the one or more operations, when one or more performance attributes associated with the live voice session indicate an acceptable QoS for the live voice session, and/or when available memory has decreased to predetermined levels.

21. The system of claim 18, wherein operation (i) is performed.

22. The system of claim 21, wherein operation (i) comprises a plurality of the following suboperations:
assigning a different service class to at least one of a plurality of packets associated with the session;
assigning a different priority level to at least one of the plurality of packets associated with the session;
causing at least one of the plurality of packets to use a different Differentiated Services Code Point;
making the session into a guaranteed service;
changing the codec at least one of the first and second nodes; and
switching at least one of the plurality of packets onto a circuit switched network.

23. The system of claim 18, wherein operation (ii) is performed.

24. The system of claim 23, wherein a first sampling frequency used before the message is received is less than a second sampling frequency used after the message is received.

25. The system of claim 18, wherein operation (iii) is performed.

26. The system of claim 25, wherein a first type of session-related performance attributes collected before the message is received comprises a plurality of a packetization loss associated with the session, an actual and/or average jitter buffer delay associated with at least one of the first and second network nodes, jitter associated with the session, available bandwidth during the session, and an actual and/or average round-trip time associated with session-related packets and wherein a second type of session-related performance attributes collected after the message is received comprises at least four of the following: a total number of received packets associated with the session, a total number of received octets associated with the session, an actual and/or average round-trip time of at least one packet associated with the session, an actual and/or average jitter buffer delay associated with at least one of the first and second network nodes, a packetization loss associated with the session, a packet loss burst size associated with the session, a number of out of order packets associated with the session, an out of order distance associated with the session, jitter associated with the session, available bandwidth during the session, largest sequence jump associated with the session, largest sequence fall associated with the session; maximum jitter associated with the session, number of jitter buffer under-runs associated with the session, number of jitter buffer over-runs associated with the session, a number of sequence jump instances associated with the session, a number of sequence fall instances associated with the session, trace route hop count associated with the session, time to live associated with the session, trace route per hop associated with the session, and echo tail length associated with the session.

27. The system of claim 18, wherein operation (iv) is performed.

28. The system of claim 27 wherein operation (iv) comprises the suboperation of:
contacting at least one of a router and switch to obtain queue-related information, the queue related information comprising a plurality of a queue length, whether the at least one of a router and switch is dropping packets, a number of packets being dropped, and why packets are being dropped.

29. The system of claim 18, wherein the statistic collection agent is further operable, in response to receipt of the message, to forward a problem notification message to an address associated with network administration and wherein a session participant can toggle the at least one of the following operations (i) to (iv) on and off depending on his perception of the quality of service of the session.

30. The system of claim 18, wherein the statistic collection agent is further operable, when a performance level falls below a specified threshold, to set a flag associated with the session, wherein the flag causes retention of predetermined types of collected performance attributes associated with the session and to parse through each packet received in the live voice session and determining, on a packet-by-packet basis, whether a the flag is set.

31. The system of claim 18, wherein the input is further operable to receiving from the at least one of the first and second network nodes a message indicating that service problem has lessened or ceased.

32. A method for conducting a live voice communication session in a network between at least first and second network nodes, comprising:
- (a) during the live voice communication session a session monitor associated with at least one of the first and second network nodes parsing through one or more packets associated with the session to identify one or more session-related performance attributes, wherein the first and second network nodes are nodes that originate messages transmitted during the live voice communication session;
- (b) during the session the session monitor comparing the one or more session-related performance attributes with corresponding predetermined value for the one or more performance attributes;
- (c) when the one or more session-related performance attributes at least one of equals and exceeds the corresponding predetermined value for the one or more performance attributes, the session monitor causing one or more computational components, during the session, to operate in a detailed monitoring mode, wherein in the detailed monitoring mode at least one of the following operations is performed:
  - (i) reconfiguring one or more resources in the network, said reconfiguring step comprising at least one of the following suboperations:
    - (A) causing at least one of the plurality of packets when transmitted by the at least one of the first and second network nodes to use a different Differentiated Services Code Point; and
    - (B) switching at least one of the plurality of packets onto a circuit switched network;
  - (ii) altering the types of session-related performance attributes being collected regarding the network; and
  - (iii) collecting session-related information from nonparticipant nodes, the nonparticipant nodes comprising at least one of a switch and router.

33. The method of claim 32, wherein operation (i) is performed.

34. The method of claim 33, wherein operation (i) comprises a plurality of the following suboperations:
- assigning a different service class to at least one of a plurality of packets associated with the session;
- assigning a different priority level to at least one of the plurality of packets associated with the session;
- causing at least one of the plurality of packets to use a different Differentiated Services Code Point;
- making the session into a guaranteed service;
- changing a codec in at least one of the first and second nodes; and
- switching at least one of the plurality of packets onto a circuit switched network.

35. The method of claim 32, wherein operation (ii) is performed.

36. The method of claim 35, wherein a first type of session-related performance attributes collected before step (c) comprises a plurality of a packetization loss associated with the session, an actual and/or average jitter buffer delay associated with at least one of the first and second network nodes, jitter associated with the session, available bandwidth during the session, and an actual and/or average round-trip time associated with session-related packets and wherein a second type of session-related performance attributes collected after step (c) comprises at least four of the following: a total number of received packets associated with the session, a total number of received octets associated with the session, an actual and/or average round-trip time of at least one packet associated with the session, an actual and/or average jitter buffer delay associated with at least one of the first and second network nodes, a packetization loss associated with the session, a packet loss burst size associated with the session, a number of out of order packets associated with the session, an out of order distance associated with the session, jitter associated with the session, available bandwidth during the session, largest sequence jump associated with the session, largest sequence fall associated with the session; maximum jitter associated with the session, number of jitter buffer under-runs associated with the session, number of jitter buffer over-runs associated with the session, a number of sequence jump instances associated with the session, a number of sequence fall instances associated with the session, trace route hop count associated with the session, time to live associated with the session, trace route per hop associated with the session, and echo tail length associated with the session.

37. The method of claim 32, wherein operation (iii) is performed.

38. The method of claim 37, wherein operation (iii) comprises:
- contacting at least one of a router and switch to obtain queue-related information, the queue related information comprising a plurality of a queue length, whether the at least one of a router and switch is dropping packets, a number of packets being dropped, and why packets are being dropped.

39. The method of claim 32, further comprising:
- in response to step (b), forwarding a problem notification message to an address associated with network administration.

40. A device operable to conduct and/or monitor a live voice communication session in a network between at least first and second network nodes, comprising:
- a performance monitoring agent operable to:
  - (a) during the live voice communication session, parse through one or more packets associated with the session to identify one or more session-related performance attributes,
  - (b) during the live voice communication session, compare the one or more session-related performance attributes with corresponding predetermined value for the one or more performance attributes, and
  - (c), when the one or more session-related performance attributes at least one of equals and exceeds the corresponding predetermined value for the one or more performance attributes, cause one or more computational components to operate, during the live voice communication session, in a detailed monitoring mode, wherein in the detailed monitoring mode at least one of the following operations is performed:
    - (i) reconfiguring one or more resources in the network, said reconfiguring operation comprising at least one of the following suboperations:
      - (A) causing at least one of the plurality of packets when transmitted by the at least one of the first and second network nodes to use a different Differentiated Services Code Point, wherein the first and second network nodes are nodes that originate messages transmitted during the live voice communication session; and
      - (B) switching at least one of the plurality of packets onto a circuit switched network;
    - (ii) altering the types of session-related performance attributes being collected regarding the network; and
    - (iii) collecting session-related information from nonparticipant nodes other than the at least first and second network nodes, the nonparticipant nodes comprising at least one of a switch and router.

41. The device of claim 40, wherein operation (i) is performed.

42. The device of claim 41, wherein operation (i) comprises a plurality of the following suboperations:
assigning a different service class to at least one of a plurality of packets associated with the session;
assigning a different priority level to at least one of the plurality of packets associated with the session;
causing at least one of the plurality of packets to use a different Differentiated Services Code Point;
making the session into a guaranteed service;
changing a codec in at least one of the first and second nodes; and
switching at least one of the plurality of packets onto a circuit switched network.

43. The device of claim 40, wherein operation (ii) is performed.

44. The device of claim 43, wherein a first type of session-related performance attributes collected before step (c) comprises a plurality of a packetization loss associated with the session, an actual and/or average jitter buffer delay associated with at least one of the first and second network nodes, jitter associated with the session, bandwidth during the session, and an actual and/or average round-trip time associated with session-related packets and wherein a second type of session-related performance attributes collected after step (c) comprises at least four of the following: a total number of received packets associated with the session, a total number of received octets associated with the session, an actual and/or average round-trip time of at least one packet associated with the session, an actual and/or average jitter buffer delay associated with at least one of the first and second network nodes, a packetization loss associated with the session, a packet loss burst size associated with the session, a number of out of order packets associated with the session, an out of order distance associated with the session, jitter associated with the session, bandwidth during the session, largest sequence jump associated with the session, largest sequence fall associated with the session; maximum jitter associated with the session, number of jitter buffer under-runs associated with the session, number of jitter buffer over-runs associated with the session, a number of sequence jump instances associated with the session, a number of sequence fall instances associated with the session, trace route hop count associated with the session, time to live associated with the session, trace route per hop associated with the session, and echo tail length associated with the session.

45. The device of claim 40, wherein operation (iii) is performed.

46. The device of claim 45, wherein operation (iii) comprises:
contacting at least one of a router and switch to obtain queue-related information, the queue related information comprising a plurality of a queue length, whether the at least one of a router and switch is dropping packets, a number of packets being dropped, and why packets are being dropped.

47. The device of claim 40, wherein the performance monitoring agent is further operable, in response to step (b), to forward a problem notification message to an address associated with network administration.

48. The device of claim 40, wherein the device is one of a telephone, a soft phone, an IP hard phone, a personal computer, a PDA, a pager, and a wireless phone.

49. A method for conducting a live voice communication session in a network between at least first and second network nodes, comprising:
(a) parsing during the live voice communication session, by a session monitor associated with at least one of the first and second network nodes, through one or more packets associated with the session to identify one or more session-related performance attributes from a first set of session-related performance attributes;
(b) during the session, comparing, by the session monitor, the one or more session-related performance attributes with corresponding predetermined value for the one or more performance attributes;
(c) when the one or more session-related performance attributes at least one of equals and exceeds the corresponding predetermined value for the one or more performance attributes, causing, by the session monitor, one or more computational components, during the session, to operate in a detailed monitoring mode; and
(d) altering the types of session-related performance attributes being collected regarding the network during the detailed monitoring mode, wherein altering the types of session-related performance attributes being collected comprises changing from monitoring the first set of session-related performance attributes to monitoring a second set of session-related performance attributes, wherein the second set of session-related performance attributes comprise at least one session-related performance attribute that is not in the first set of session-related performance attributes.

50. The method of claim 49, wherein the first set of session-related performance attributes comprise a plurality of a packetization loss associated with the session, an actual and/or average jitter buffer delay associated with at least one of the first and second network nodes, jitter associated with the session, bandwidth during the session, and an actual and/or average round-trip time associated with session-related packets and wherein the second set of session-related performance attributes comprise at least one of the following: a total number of received packets associated with the session, a total number of received octets associated with the session, an actual and/or average round-trip time of at least one packet associated with the session, an actual and/or average jitter buffer delay associated with at least one of the first and second network nodes, a packetization loss associated with the session, a packet loss burst size associated with the session, a number of out of order packets associated with the session, an out of order distance associated with the session, jitter associated with the session, bandwidth during the session, largest sequence jump associated with the session, largest sequence fall associated with the session; maximum jitter associated with the session, number of jitter buffer under-runs associated with the session, number of jitter buffer over-runs associated with the session, a number of sequence jump instances associated with the session, a number of sequence fall instances associated with the session, trace route hop count associated with the session, time to live associated with the session, trace route per hop associated with the session, and echo tail length associated with the session.

* * * * *